United States Patent
Wang et al.

(10) Patent No.: US 11,554,318 B2
(45) Date of Patent: Jan. 17, 2023

(54) METHODS OF TRANSMITTING AND RECEIVING ADDITIONAL SIB1-NB SUBFRAMES IN A NB-IOT NETWORK

(71) Applicant: Telefonaktiebolaget LM Ericsson (publ), Stockholm (SE)

(72) Inventors: Yi-Pin Eric Wang, Fremont, CA (US); Magnus Åström, Lund (SE); Yutao Sui, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 317 days.

(21) Appl. No.: 16/763,688

(22) PCT Filed: Nov. 16, 2018

(86) PCT No.: PCT/SE2018/051185
§ 371 (c)(1),
(2) Date: May 13, 2020

(87) PCT Pub. No.: WO2019/098932
PCT Pub. Date: May 23, 2019

(65) Prior Publication Data
US 2020/0374083 A1    Nov. 26, 2020

Related U.S. Application Data

(60) Provisional application No. 62/587,656, filed on Nov. 17, 2017.

(51) Int. Cl.
*A63F 13/217*    (2014.01)
*H04L 1/08*    (2006.01)
(Continued)

(52) U.S. Cl.
CPC .......... *A63F 13/217* (2014.09); *A63F 13/803* (2014.09); *B63B 32/70* (2020.02);
(Continued)

(58) Field of Classification Search
CPC ....... H04L 1/00; H04L 1/0066; H04L 1/0069; H04L 1/08; H04L 1/1874; H04L 5/0044;
(Continued)

(56) References Cited

U.S. PATENT DOCUMENTS

2017/0251443 A1    8/2017    Shin et al.

FOREIGN PATENT DOCUMENTS

| CN | 102224701 A | 10/2011 |
| CN | 107040282 A | 8/2017 |

(Continued)

OTHER PUBLICATIONS

LG Electronics, "System information acquisition time enhancement in NB-IoT", 3GPP TSG RAN WG1 Meeting #89, R1-1707578, Hangzhou, P.R. China, May 15-19, 2017 (Year: 2017).*
LG Electronics, "System information acquisition time enhancement in NB-IoT", 3GPP TSG RAN WG1 Meeting #90, R1-1713108, Prague, Czech Republic, Aug. 21-25, 2017 (Year: 2017).*
(Continued)

*Primary Examiner* — Michael Thier
*Assistant Examiner* — Nevena Zecevic Sandhu
(74) *Attorney, Agent, or Firm* — Baker Botts, LLP

(57) ABSTRACT

A method performed by a network node comprises transmitting a transmission of system information. The transmission comprises coded bits obtained by reading from a circular buffer. The transmission is transmitted in a first set of subframes corresponding to subframes #4 of a plurality of radio frames. The method further comprises transmitting an additional transmission of the system information. The additional transmission comprises additional coded bits obtained by continuing reading from the circular buffer. The additional transmission is transmitted in a second set of subframes corresponding to subframes of the plurality of radio frames other than subframes #4.

18 Claims, 14 Drawing Sheets

(51) Int. Cl.
　　*H04L 1/00*　　　(2006.01)
　　*H04L 5/00*　　　(2006.01)
　　*B63B 32/70*　　(2020.01)
　　*H04L 1/18*　　　(2006.01)
　　*H04W 72/04*　　(2009.01)
　　*A63F 13/803*　　(2014.01)
　　*H04W 48/12*　　(2009.01)

(52) U.S. Cl.
　　CPC .............. *H04L 1/00* (2013.01); *H04L 1/0066* (2013.01); *H04L 1/0069* (2013.01); *H04L 1/08* (2013.01); *H04L 1/1874* (2013.01); *H04L 5/0044* (2013.01); *H04L 5/0053* (2013.01); *H04W 72/0446* (2013.01); *H04L 5/0069* (2013.01); *H04W 48/12* (2013.01)

(58) Field of Classification Search
　　CPC ....... H04L 5/0053; H04L 5/0069; H04L 5/00; H04L 27/26; H04W 72/0446; H04W 48/12; H04W 72/04
　　See application file for complete search history.

(56) References Cited

FOREIGN PATENT DOCUMENTS

| | | |
|---|---|---|
| CN | 107222826 A | 9/2017 |
| RU | 2 584 149 C1 | 5/2012 |
| WO | 2016 165126 A1 | 10/2016 |
| WO | 2017 196393 A1 | 11/2017 |
| WO | 2018 174614 A1 | 9/2018 |

OTHER PUBLICATIONS

3GPP TSG-RAN1 #84; St. Julian's, Malta; Source: Ericsson; Title: NB-IoT—Design considerations for NB-PDSCH KR1-160264)—Feb. 15-19, 2016.
Notice of Reasons for Rejection issued for Patent Application No. 2020-526096—dated Aug. 3, 2021.
Russian Office Action issued for Application No. 2020113196/07(022274—dated Sep. 17, 2020.
PCT International Preliminary Report On Patentability for International application No. PCT/SE2018/051185—dated Dec. 13, 2019.
3GPP TSG RAN WG1 Meeting 90bis; Prague, CZ; Source: LG Electronics; Title: System information acquisition latency enhancement (R1-1717278)—Oct. 9-13, 2017.
3GPP TSG RAN WG1 Meeting #90bis; Prague, Czech Republic, Title: Chairman's Notes of A1 6.2.6 Further enhancements of NB-IoT; Source: Ad-Hoc chair (Huawei) (R1-1719127)—Oct. 9-13, 2017.
PCT International Search Report for International application No. PCT/SE2018/051185—dated Feb. 26, 2019.
PCT Written Opinion of the International Searching Authority issued for International application No. PCT/SE2018/051185—dated Feb. 26, 2019.
ETSI TS 136 211 v14.2.0; Technical Specification; LTE; Evolved Universal Terrestrial Radio Access (E-UTRA) Physical channels and modulation (3GPP TS 36.211 version 14.2.0 Release 14)—Apr. 2017.
First Office Action issued by the China National Intellectual Property Administration (CNIPA) for Chinese Patent Application No. 201880065267.5—dated Jun. 6, 2022.

* cited by examiner

METHODS OF TRANSMITTING AND RECEIVING ADDITIONAL SIB1-NB SUBFRAMES IN A NB-IOT NETWORK

PRIORITY

This nonprovisional application is a U.S. National Stage Filing under 35 U.S.C. § 371 of International Patent Application Serial No. PCT/SE2018/051185 filed Nov. 16, 2018 and entitled "*Methods of Transmitting and Receiving Additional SIB1-NB Subframes in a NB-IoT Network*" which claims priority to U.S. Provisional Patent Application No. 62/587,656 filed Nov. 17, 2017 both of which are hereby incorporated by reference in their entirety.

TECHNICAL FIELD

Certain embodiments of the present disclosure relate, in general, to wireless communications, and more particularly to methods of transmitting and receiving additional System Information Block Type 1-Narrowband (SIB1-NB) subframes in a Narrowband Internet-of-Things Network.

BACKGROUND

Narrowband Internet of Things (NB-IoT) is a narrowband system introduced in 2016 by the third generation partnership project (3GPP) for a cellular internet of things. The system provides access to network services using a physical layer optimized for very low device power consumption. Additionally, the system is designed to achieve deployment flexibility, only requiring a system bandwidth of 180 kHz, and robust coverage, supporting up to 164 dB coupling loss. The system coexists well with long term evolution (LTE) systems. For example, the system can be deployed inside an LTE carrier using one of the LTE Physical Resource Blocks (PRBs), or it can be deployed in the LTE guard band. Thanks to its fairly small system bandwidth, it can also be deployed using refarmed GSM spectrum. FIG. 1 gives an illustration for the three NB-IoT operation modes.

NB-IoT has the following characteristics:
 low throughput devices (e.g., 2 kbps)
 low delay sensitivity (~10 seconds)
 ultra-low device cost (below $5 dollars)
 low device power consumption (battery life of 10 years)

It is envisioned that each cell (~1 km$^2$) in this system will serve tens of thousands (~50,000) of devices such as sensors, meters, actuators, and the like.

Since its introduction in 2016, many further enhancements have been introduced to NB-IoT. Currently, 3GPP is working on improving the system acquisition performance. One of the steps of system acquisition is for a device to acquire NB-IoT system information type 1 (SIB1-NB). SIB1-NB carries information such as the scheduling information for other system information blocks, SIB2-NB, SIB3-NB, SIB4-NB, SIB5-NB, SIB14-NB, and SIB16-NB. With such information, the device knows how to acquire these additional system information blocks.

SIB1-NB can be repeated up to 16 times, and in that case a SIB1-NB codeword is transmitted in 8 subframes and each of these subframes is transmitted in the subframe #4 of every other frame. A radio frame has 10 subframes. An illustration is given in FIG. 2. Here, only 2 of the 16 repetitions are shown. Let N be the length of SIB1-NB codeword. A SIB1-NB codeword is scrambled based a scrambling sequence of length N. Let w(n) and c(n) be the nth coded bit and nth element of the scrambling sequence, respectively. The nth scrambled coded bit is therefore:

$$w'(n)=w(n)+c(n), n=0, 1, \ldots, N-1.$$

Here the summation is a modulo-2 sum. The scrambling sequence is re-initialized at the start of each repetition.

SUMMARY

There currently exist certain challenge(s). It has been found that, in certain deployment scenarios, a device in bad coverage may experience long system acquisition time. In release 15, 3GPP has decided to use additional subframes for SIB1-NB transmissions. It has been agreed that subframe #3 in the same frame where legacy SIB1-NB is transmitted may be used as additional SIB1-NB subframes.

One important issue is how to generate the coded bits and scrambling sequences for the additional SIB1-NB subframes. A desirable design shall satisfy the following criteria:
 It should be backward compatible.
 It should achieve a good processing gain for suppressing inter-cell interference. To achieve this, it is desirable that the scrambling sequence used in the additional SIB1-NB subframes (i.e., subframe #3) are different from the legacy SIB1-NB subframes (i.e., subframe #4).
 It should not increase storage requirement significantly.

Certain aspects of the present disclosure and their embodiments may provide solutions to these or other challenges. There are, proposed herein, various embodiments which address one or more of the issues disclosed herein. For example, the embodiments include:
 (1) Determining the number of additional SIB1-NB subframes based on the transport block sizes of SIB1-NB.
 (2) A method of generating the coded bits that will be transmitted in the additional SIB1-NB subframes.
 (3) A method of generating the scrambling sequences that will be used to scramble the coded bits to be transmitted in the additional SIB1-NB subframes.

According to certain embodiments, a method performed by a network node comprises transmitting a transmission of system information. The transmission comprises coded bits obtained by reading from a circular buffer. The transmission is transmitted in a first set of subframes corresponding to subframes #4 of a plurality of radio frames. The method further comprises transmitting an additional transmission of the system information. The additional transmission comprises additional coded bits obtained by continuing reading from the circular buffer. The additional transmission is transmitted in a second set of subframes corresponding to subframes of the plurality of radio frames other than subframes #4.

According to certain embodiments, a base station comprises power supply circuitry and processing circuitry. The power supply circuitry is configured to supply power to the network node. The processing circuitry is configured to transmit a transmission of system information. The transmission comprises coded bits obtained by reading from a circular buffer. The transmission is transmitted in a first set of subframes corresponding to subframes #4 of a plurality of radio frames. The processing circuitry is further configured to transmit an additional transmission of the system information. The additional transmission comprises additional coded bits obtained by continuing reading from the circular buffer. The additional transmission is transmitted in a second set of subframes corresponding to subframes of the plurality of radio frames other than subframes #4.

According to certain embodiments, a computer program product comprises instructions which, when executed by a network node, cause the network node to transmit a transmission of system information. The transmission comprises coded bits obtained by reading from a circular buffer. The transmission is transmitted in a first set of subframes corresponding to subframes #4 of a plurality of radio frames. The instructions, when executed by the network node, further cause the network node to transmit an additional transmission of the system information. The additional transmission comprises additional coded bits obtained by continuing reading from the circular buffer. The additional transmission is transmitted in a second set of subframes corresponding to subframes of the plurality of radio frames other than subframes #4.

The above-described method, base station, and computer program may include one or more additional features, such as any one or more of the following:

In some embodiments, the second set of subframes correspond to subframes #3.

In some embodiments, sixteen repetitions of the first set of subframes are configured and the second set of subframes are configured based on having configured the sixteen repetitions of the first set of subframes.

In some embodiments, the first set of subframes comprises eight subframes transmitted in every other subframe #4.

In some embodiments, sixteen repetitions of the first set of subframes are transmitted.

In some embodiments, a starting index for reading from the circular buffer is obtained using a modulo function based on a number of coded bits that can be mapped to the system information and the size of the circular buffer.

In some embodiments, the system information comprises SIB1-NB information.

According to certain embodiments, a method performed by a wireless device comprises receiving a transmission of system information. The transmission comprises coded bits received in a first set of subframes corresponding to subframes #4 of a plurality of radio frames. The method further comprises receiving an additional transmission of the system information. The additional transmission comprises additional coded bits. The additional transmission is received in a second set of subframes corresponding to subframes of the plurality of radio frames other than subframes #4. The additional coded bits are associated with starting indexes continuing from starting indexes associated with the coded bits.

According to certain embodiments, a wireless device comprises power supply circuitry and processing circuitry. The power supply circuitry is configured to supply power to the wireless device. The processing circuitry is configured to receive a transmission of system information. The transmission comprises coded bits received in a first set of subframes corresponding to subframes #4 of a plurality of radio frames. The processing circuitry is further configured to receive an additional transmission of the system information. The additional transmission comprises additional coded bits. The additional transmission is received in a second set of subframes corresponding to subframes of the plurality of radio frames other than subframes #4. The additional coded bits are associated with starting indexes continuing from starting indexes associated with the coded bits.

According to certain embodiments, a computer program product comprises instructions which, when executed by a wireless device, cause the wireless device to receive a transmission of system information. The transmission comprises coded bits received in a first set of subframes corresponding to subframes #4 of a plurality of radio frames. The instructions, when executed by a wireless device, further cause the wireless device to receive an additional transmission of the system information. The additional transmission comprises additional coded bits. The additional transmission is received in a second set of subframes corresponding to subframes of the plurality of radio frames other than subframes #4. The additional coded bits are associated with starting indexes continuing from starting indexes associated with the coded bits.

The above-described method, wireless device, and computer program may include one or more additional features, such as any one or more of the following:

In some embodiments, the second set of subframes correspond to subframes #3.

In some embodiments, the first set of subframes comprises eight subframes received in every other subframe #4.

In some embodiments, at least a portion of the system information is received in one or more repetitions of the first set of subframes.

In some embodiments, the coded bits are stored in a circular buffer according to the starting indexes associated with the coded bits and the additional coded bits are stored in the circular buffer according to the starting indexes that continue from the starting indexes associated with the coded bits.

In some embodiments, a first starting index is obtained using a modulo function based on a number of coded bits that can be mapped to the system information and the size of the circular buffer.

In some embodiments, the system information comprises SIB1-NB information.

According to certain embodiments, the usage of the uplink pilot time slot (UpPTS) and downlink pilot time slot (DwPTS) fields are carried on the special subframes for NB-IoT transmissions in time division duplex (TDD) mode. For downlink (DL), the re-mapping over the DwPTS fields of some of the orthogonal frequency division multiplexing (OFDM) symbols are carried in the DL subframe preceding the special subframe. For uplink (UL), the pre-mapping over the UpPTS fields of some of the OFDM symbols are carried in the UL subframe to be transmitted right after the special subframe.

Certain embodiments may provide one or more of the following technical advantage(s). Embodiments of the present disclosure satisfy the aforementioned criteria.

It is backward compatible.

It achieves a good processing gain for suppressing inter-cell interference. To achieve this, it is desirable that the scrambling sequence used in the additional SIB1-NB subframes (i.e., subframe #3) are different from the legacy SIB1-NB subframes (i.e., subframe #4).

It does not increase storage requirement significantly.

DETAILED DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Number of Additional SIB1-NB Subframes

Figure 1:
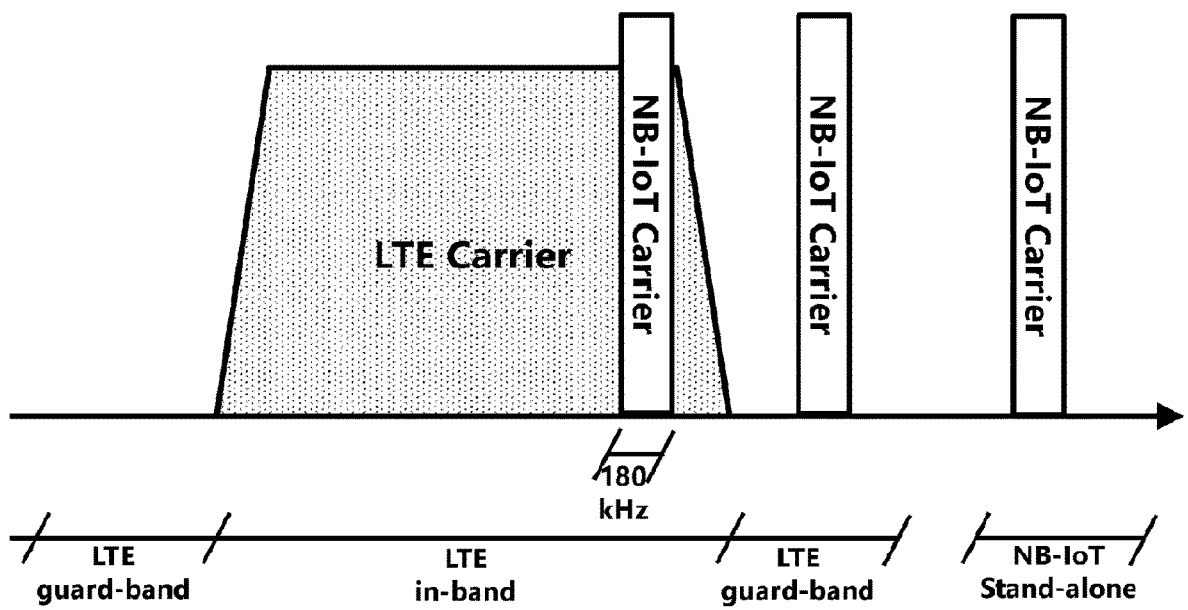
FIG. 1 illustrates an example of NB-IoT operating modes, in accordance with some embodiments.
Figure 2:
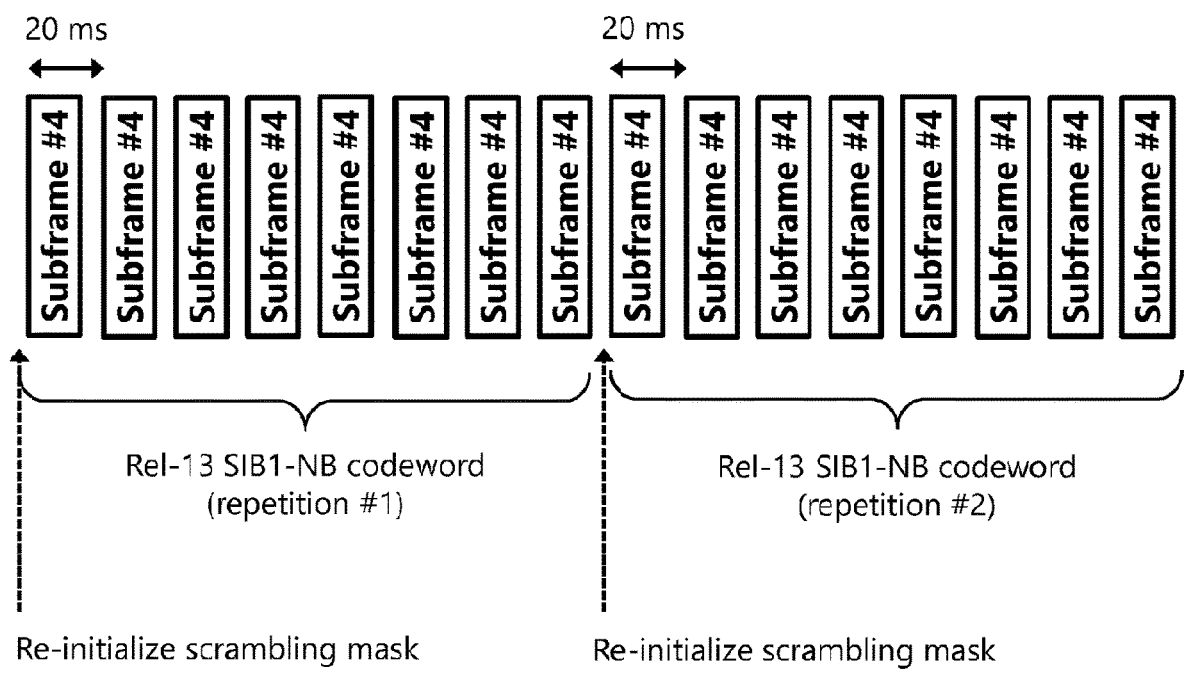
FIG. 2 illustrates an example of SIB1-NB repetitions, in accordance with some embodiments.

Each SIB1-NB codeword is transmitted in 8 SIB1-NB subframes and can be configured for up to 16 repetitions in a transmission interval of 256 frames. Notice that it only makes sense to configure additional SIB1-NB repetitions if the use of 16 is not enough. When it is configured for 16 repetitions, every other subframe #4 is used for SIB1-NB transmissions, as shown in FIG. 2. If subframe #3 is additionally used for SIB1-NB transmissions, three options may be considered.

Option 1: use every other subframe #3
Option 2: use every 4th subframe #3
Option 3: use every 8th subframe #3

Option 3, using every 8th subframe #3, is expected to improve the performance by approximately 10 log 10(20/16)=1 dB. This improvement may be too small for certain applications. Options 1 and 2 improve the performance by 3 or 1.8 dB, respectively, at the cost of 5% and 2.5% overhead on an NB-IoT anchor carrier.

There are four different transport block sizes (TBSs) that are supported for SIB1-NB, i.e., 208, 328, 440 and 680. When the TBS is small, the coding gain is relatively larger, therefore we can configure a small amount of repetitions. When the TBS is larger, more repetitions are foreseeable to be more useful. For example, for TBS 208 and 328, option 2 can be used, and for TBS 440 and 680, option 1 can be used.

Coded Bits-to-Subframe Allocation of Additional SIB1-NB Transmission

The tail-biting convolutional code (TBCC) coded bits are generated by reading from the virtual buffer. Let E be the length of the SIB1-NB codeword, Following the rate matching operation of subclause 5.1.4.2.2 in 3GPP Technical Specification 36.212, the TBCC codeword for SIB1-NB $w_4=(c_0, c_1, \ldots, c_{E-1})$ can be obtained. Here, we use subscript '4' to denote that codeword $w_4$ is mapped to subframes #4 used for legacy SIB1-NB transmissions. When SIB1-NB is configured for 16 repetitions, the codeword $w_4$ is transmitted in 16 frames, as shown in FIG. 2. Assume K is the number of subframe #3 used for additional SIB1-NB transmissions in a 16 frame interval. The number of coded bits that can be fit into these additional subframes is $$E' = \frac{EK}{8}.$$

Note that if every other subframe #3 is used for SIB1-NB, K=8, and therefore E'=E. The present disclosure proposes that the coded bits that are mapped to subframe #3 used for additional SIB1-NB transmissions are generated by continuing reading from the virtual circular buffer, $w=(w_4,w_3)=(c_0, c_1, \ldots, c_{E-1}, c_E, c_{E+1}, \ldots, c_{E+E'-1})$. The codeword w can be thought of as an extended SIB1-NB codeword expected by a Release 15 user equipment (UE). It consists of a first part, the original Release 14 SIB1-NB codeword expected by a Release 13 or Release 14 UE, and a second part, codeword extension mapped to additional Release 15 SIB1-NB subframes. Mapping of these additional coded bits to resource elements in subframe #3 used for SIB1-NB transmission follows the exact same method of mapping SIB1-NB coded bits to subframe #4 used for SIB1-NB transmissions. An illustration is provided in FIG. 3 (illustration of mapping the Rel-15 extended codeword to SIB1-NB subframes). For each SIB1-NB subframe, the coded bits can be obtained by using a proper starting index for reading out the virtual circular buffer.

Given a TBS=S, the size of the virtual circular buffer is 3S. Here the factor 3 is due to the use of a rate-1/3 TBC as the mother code.

The starting index for reading out the virtual circular buffer for obtaining the coded bits for the $i^{th}$ legacy SIB1-NB subframe (i.e., transmitted in subframe #4), i=0, 1, ..., 7, is mod(iN, 3S), where N is the number coded bits that can be mapped to one SIB1-NB subframe.

Certain embodiments of the present disclosure use the same virtual circular buffer as was employed for generating the coded bits for legacy SIB1-NB subframes in order to generate the coded bits for the additional SIB1-NB subframes. Thus, there is no increase in the virtual circular buffer size. The starting index for reading out the virtual circular buffer for obtaining the coded bits for the $i^{th}$ additional SIB1-NB subframe (i.e., transmitted in subframe #3), i=0, 1, ..., L, is mod(iN+8N, 3S), where L is 8 for option 1 and 4 for option 2.

The examples above have described the operation at the transmitter. At the receiver, a virtual circular buffer is used to store the received soft values. In this case, the virtual circular buffer is a decoder soft buffer, which is initialized to all zero values at the start of SIB1-NB reception. Each received soft value is then added to the correctly addressed decoder soft buffer position. The starting indexes described earlier are then the starting indexes for adding the received soft values of each SIB1-NB subframe to the circular decoder soft buffer.

Generation of Scrambling Mask

According to 3GPP Technical Specification 36.211, the scrambling sequence generator for generating the scrambling mask for SIB1-NB subframes shall be reinitialized according to the expression below for each repetition.

$$c_{init}=n_{RNTI} \cdot 2^{15}+(N_{ID}^{Ncell}+1)((n_f \bmod 61)+1), \quad \text{Eq. (1)}$$

where $n_{RNTI}$ Radio network temporary identifier
$N_{ID}^{cell}$ Physical layer cell identity
$n_f$ System frame number.

The LTE scrambling sequence is based on the Gold sequence, which is generated using two m-sequence generators. Upon re-initialization of the scrambling sequence, the first m-sequence is initialized with $x_1(0)=1$, $x_1(n)=0$, n=1, 2, ..., 30. The initialization of the second m-sequence is denoted by $c_{init}=\Sigma_{i=0}^{30}x_2(i) \cdot 2^i$ with the value determined based on Eq. (1).

Figure 4:
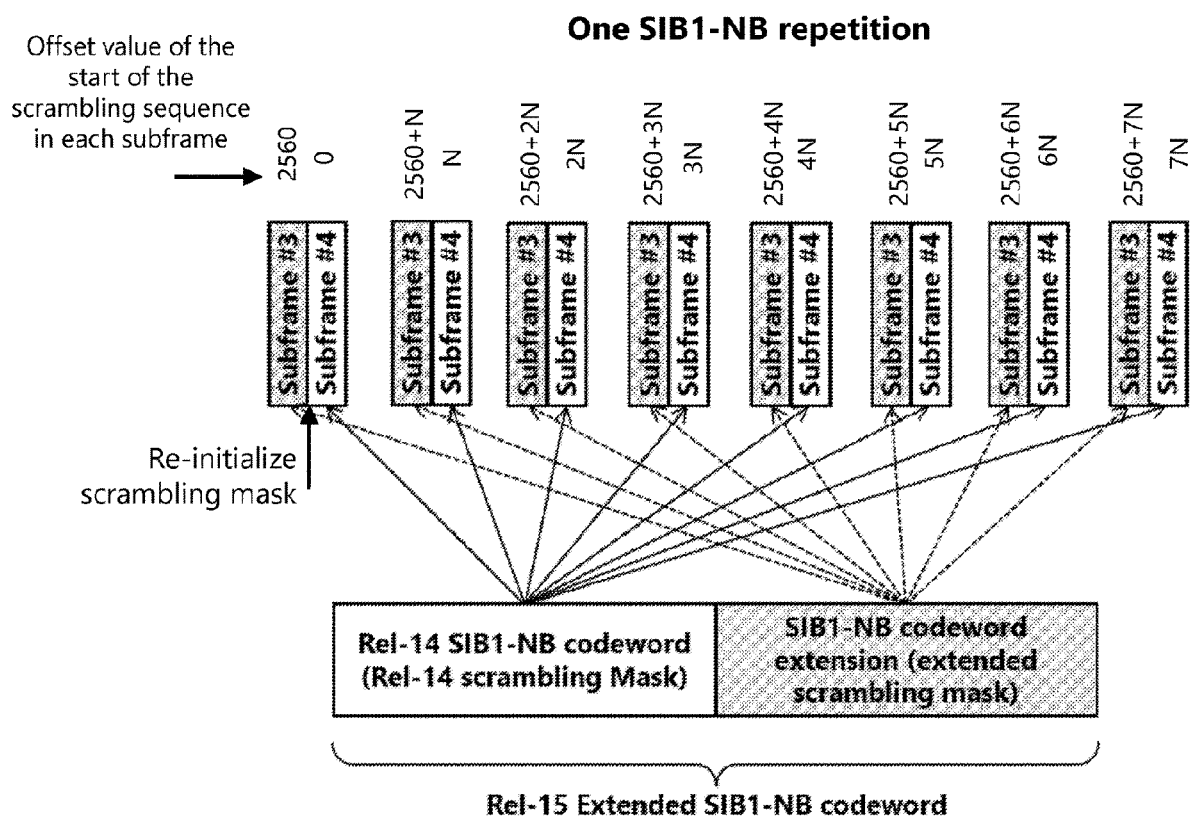
FIG. 4 illustrates an example of offset values for the start of a scrambling sequence, in accordance with some embodiments.

Certain embodiments of the present disclosure use the same reinitialization scheme based on the Release 13 and Release 14 specifications. However, the scrambling sequence is extended to cover the additional encoded bits. An illustration is shown in FIG. 4 (illustration of SIB1-NB scrambling sequence re-initialization and generation). One option uses every other subframe #3. The scrambling sequence generator is re-initialized according to (1) at the first subframe of a SIB1-NB repetition according to the Release 14 scheme. After the re-initialization, the scrambling sequence is generated in serial-fashion to mask the Release 14 SIB1-NB codeword. Afterwards, an extended scrambling sequence is generated to mask the extended part of the extended codeword. However, it is not desirable for the evolved node B (eNB, base station) or UE to need to store the entire scrambling mask. It is highly desirable that the scrambling sequence can be generated on-the-fly. To achieve this, certain embodiments of the present disclosure generate the scrambling sequence for each one of the additional SIB1-NB subframe with 2560 shifts relative to the scrambling sequence used in the legacy SIB1-NB subframe in the same frame. An illustration is given in FIG. 4, where N is the number of SIB1-NB coded bits carried in a SIB1-NB subframe. The offset of the start of scrambling sequence for each of the SIB1-NB subframe is relative to the first element of the scrambling sequence generated after the re-initialization of the scrambling sequence generator. The value 2560 is chosen as the number of coded bits in a SIB1-NB subframe can be at most 320 bits and thus the maximum length of the legacy SIB1-NB codeword is 320*8=2560 bits. A fixed offset value that works for all configurations is desirable for simplifying the determination of the starting state of the scrambling sequence generator in each subframe. To this end, we use a well-known m-sequence generator property; let x(i) be the m-sequence generator state at time i, $x(i)=(x(i), x(i+1), \ldots, x(i+30))^T$, the evolution of the sequence generator state can be described by $$x(i+1)=Mx(i),$$

where matrix M is determined by the sequence generator polynomial. Thus, $$x(k)=M^k x(0). \quad \text{Eq. (2)}$$

According subclause 7.2 in 3GPP TS36.211, the nth element of the scrambling sequence after reinitialization is $$c(n)=g(n+1600), \quad \text{Eq. (3)}$$

where g(n), $x_1(n)$ and $x_2(n)$ are the $n^{th}$ element of the Gold sequence, $1^{st}$ component and $2^{nd}$ component m-sequences, respectively, after re-initialization.

$$g(n)=x_1(n)+x_2(n).$$

Since the sequence is taken from the end of shift register, in essence only the first row of $M^k$ is needed. Note also that according to subclause 7.2 of 3GPP TS36.211, there is already a 1600 shift applied after the re-initialization (see Eq. (3)), thus a vector of length 31 corresponding to $y_i^{1600}=[M_i^{1600}]_1$ is needed for generating the $i^{th}$ component m-sequence for the original SIB1-NB subframes, i=1 or 2. Here, the notation $[X]_1$ is used to denote the first row of matrix X. To this end, the n-th element of the scrambling sequence is generated as $c(n)=y_1^{1600}x_1(n)+y_2^{1600}x_2(n)$. Since according to certain embodiments herein there are additional 2560 shifts between the scrambling sequence in subframe #3 (immediately before the original SIB1-NB subframe in subframe #4), the n-th element of the scrambling sequence in the additional subframe can be generated as $c'(n)=y_1^{4160}x_1(n)+y_2^{4160}x_2(n)$, where $y_i^{4160}=[M_i^{4160}]_1$. Both $y_i^{1600}$ and $y_i^{4160}$ can be pre-calculated.

Figure 5:
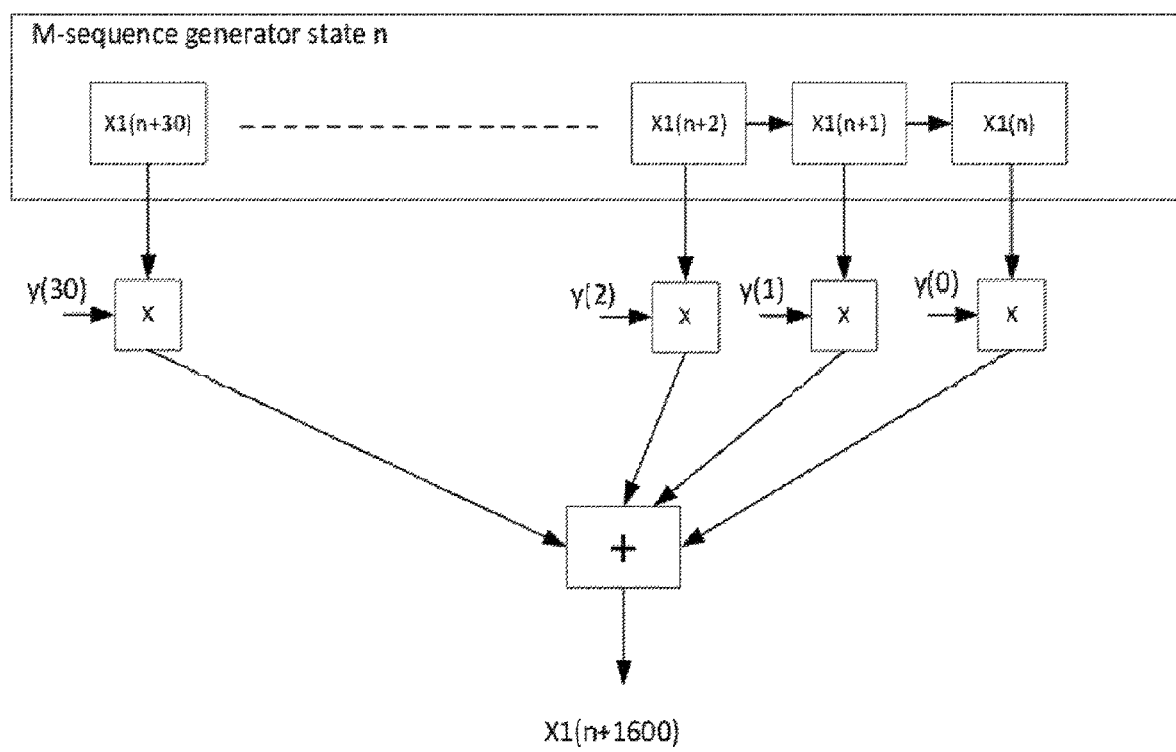
FIG. 5 illustrates an example of a sequence shifting operation, in accordance with some embodiments.

The operation of shifting $x_1(n)$ by 1600 shifts using $y_1^{1600}x_1(n)$ is illustrated in FIG. 5. In the illustration the length-31 vector $y_1^{1600}$ is represented by $y_1^{1600}=(y(0), y(1), \ldots, y(30))$.

The operation of generating the scrambling sequence is detailed below. The below example assumes option 1 is used (see FIG. 4).

(1) For the $1^{st}$ subframe #3 used for SIB1-NB in FIG. 4: reinitialize the scrambling code generator based on Eq. (1). And store the initial states of the two m-sequence generators. Generate the scrambling sequence based on $c'^{(n)}=y_1^{4160}x_1(n)+y_2^{4160}x_2(n)$, n=0, 1, ..., N−1.

(2) For the $1^{st}$ subframe #4 used for SIB1-NB in FIG. 4: Load the saved initial states of the two m-sequence generators from the previous step. Generate the scrambling sequence based on $c(n)=y_1^{1600}x_1(n)+y_2^{1600}x_2(n)$, $n=0, 1, \ldots, N-1$.

(3) For the $2^{nd}$ subframe #3 used for SIB1-NB in FIG. 4: Save the ending states of the two m-sequence generators. Generate the scrambling sequence based on $c'^{(n)}=y_1^{4160}x_1(n)+y_2^{4160}x_2(n)$, $N=N, N+1, \ldots, 2N-1$.

(4) For the $2^{nd}$ subframe #4 used for SIB1-NB in FIG. 4: Load the saved initial states of the two m-sequence generators from the previous step. Generate the scrambling sequence based on $c(n)=y_1^{1600}x_1(n)+y_2^{1600}x_2(n)$, $n=N, N+1, \ldots, 2N-1$.

Repeat steps (3) and (4) to generate the scrambling sequences for the remaining SIB1-NB subframes in FIG. 4. The only difference is the range of n is incremented by N each repetition of steps 3 and 4.

Figure 6:
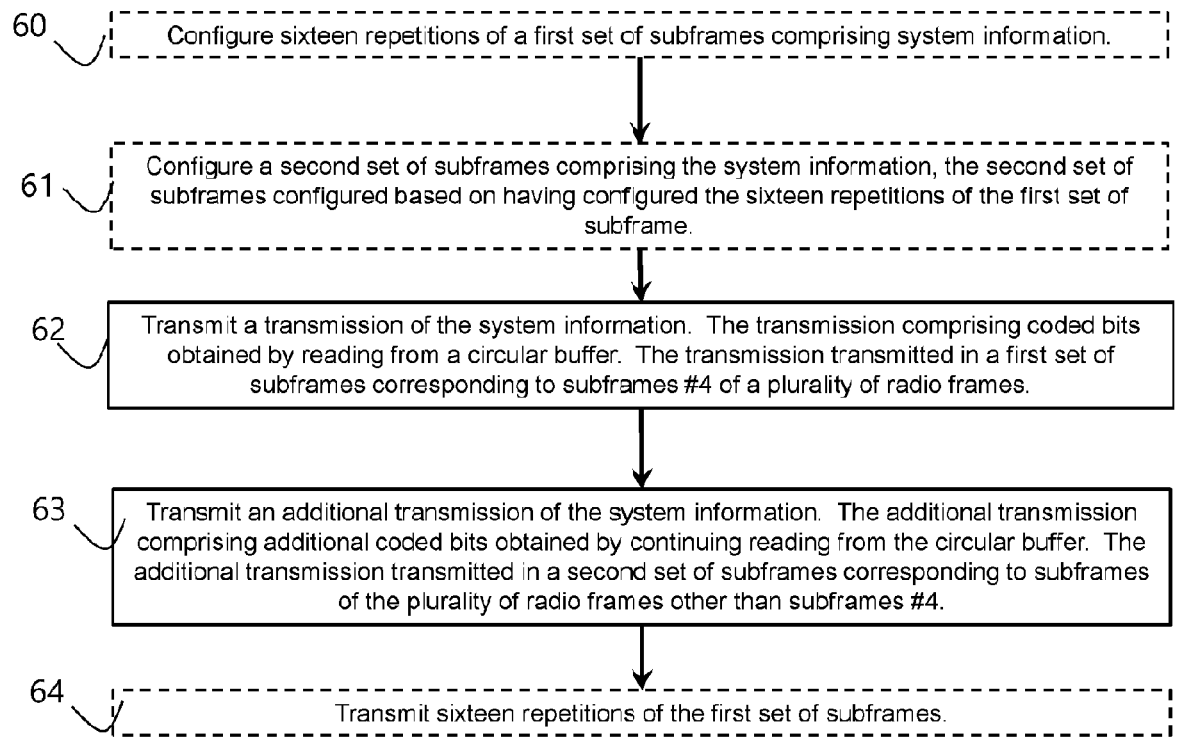
FIG. 6 illustrates an example of a method that may be performed by a network node, in accordance with some embodiments.

FIG. 6 illustrates an example of a method that may be performed by a network node, such as network node 160, 412, or 520 described below, in accordance with certain embodiments. For example, in some embodiments, a network node may include processing circuitry 170 or 528 configured to perform the method of FIG. 6. In some embodiments, the method may begin at step 62 with transmitting a transmission of system information, such as SIB-1NB information. The transmission comprises coded bits obtained by reading from a circular buffer. In some embodiments, a starting index for reading from the circular buffer is obtained using a modulo function based on a number of coded bits that can be mapped to the system information and the size of the circular buffer. For purposes of example and explanation, suppose the circular buffer has a buffer size of bits (e.g., A0-A299) and suppose the system information comprises a 400-bit long codeword (e.g., B0-B399). The method may begin reading coded bits from the circular buffer such that B0 is obtained from buffer position A0, B1 is obtained from buffer position A1, B2 is obtained from buffer position A2, and so on until reaching the last position in the circular buffer (e.g., B299 is obtained from buffer position A299). The method may then continue reading coded bits from the circular buffer beginning with buffer position A0 to obtain B300, buffer position A1 to obtain B301, and so on until the end of the codeword has been reached (e.g., B399 is obtained from buffer position A99). The transmission comprising the coded bits is transmitted in a first set of subframes corresponding to subframes #4 of a plurality of radio frames. As described above with respect to FIGS. 2-4, in some embodiments, the first set of subframes comprises eight subframes, such that each of the eight subframes may include ⅛ of the codeword (e.g., 50 bits for a 400-bit long codeword). In some embodiments, the eight subframes may be transmitted in every other subframe #4.

Figure 3:
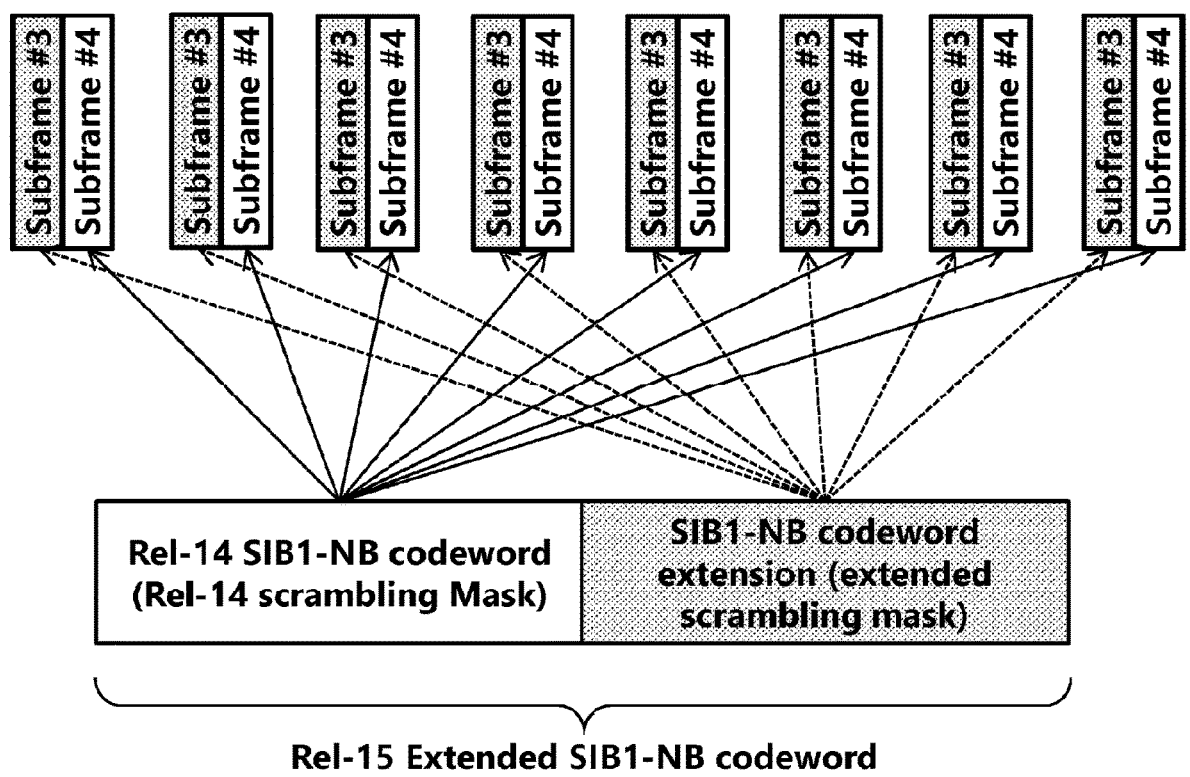
FIG. 3 illustrates an example of an extended SIB1-NB codeword, in accordance with some embodiments.

The method proceeds to step 63 with transmitting an additional transmission of the system information. The additional transmission comprises additional coded bits obtained by continuing reading from the circular buffer. Referring to the example in the previous paragraph, suppose that the network node obtained the coded bits transmitted in the first set of subframes by reading through buffer position A99. The network node may then continue reading from buffer position A100 to obtain the additional coded bits. The additional transmission comprising the additional coded bits is transmitted in a second set of subframes corresponding to subframes of the plurality of radio frames other than subframes #4. For example, the second set of subframes may correspond to subframes #3 of the plurality of radio frames. FIGS. 3-4 illustrate an embodiment in which the second set of subframes comprises eight subframes, such that each of the eight subframes may include ⅛ of the codeword comprised of the additional coded bits. In some embodiments, the eight subframes may be transmitted in every other subframe #3.

In some embodiments, the method may further include step 60 in which the method configures sixteen repetitions of the first set of subframes, step 61 in which the method configures the second set of subframes based on having configured the sixteen repetitions of the first set of subframes (e.g., the second set of subframes may be configured when sixteen repetitions are not enough), and step 64 in which the method transmits the sixteen repetitions of the first set of subframes during the transmission interval. As discussed above, in some embodiments, the first set of subframes comprise a codeword that has been split into eight subframes. In the example, the set of eight subframes containing the codeword may be transmitted in sixteen repetitions. Certain embodiments may also transmit repetitions of the second set of subframes (e.g., subframes #3 comprising the additional coded bits), such as sixteen repetitions of the second set of subframes.

Certain embodiments of the method shown in FIG. 6 may use a scrambling mask for the system information, such as a scrambling mask described with respect to FIG. 4.

Figure 7:
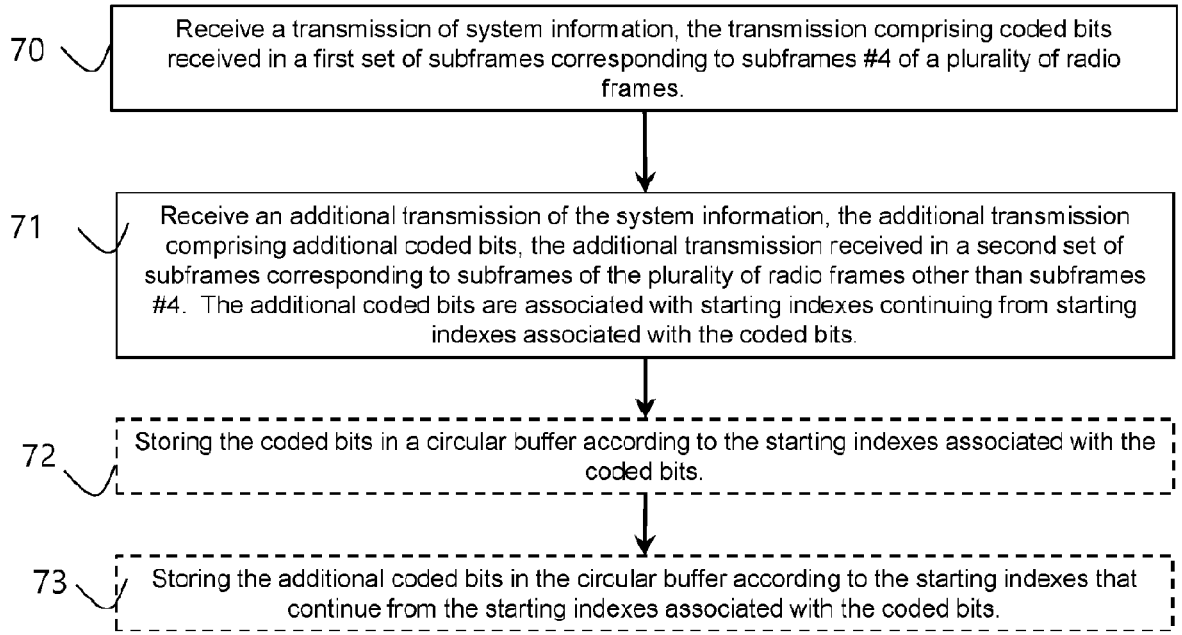
FIG. 7 illustrates an example of a method that may be performed by a wireless device, in accordance with some embodiments.

FIG. 7 illustrates an example of a method that may be performed by a wireless device, such as wireless device 110, 200, 491, 492, or 530 described below, in accordance with certain embodiments. For example, in some embodiments, a wireless device may include processing circuitry 120, 201, or 538 configured to perform the method of FIG. 7. In some embodiments, the method may begin at step 70 with receiving a transmission of system information (e.g., SIB-1NB) comprising coded bits in a first set of subframes corresponding to subframes #4 of a plurality of radio frames. In some embodiments, the first set of subframes comprises eight subframes, such that each of the eight subframes may include ⅛ of a codeword. In some embodiments, the eight subframes may be received in every other subframe #4. At least a portion of the system information may be received in one or more repetitions of the first set of subframes (such as up to sixteen repetitions).

The method proceeds to step 71 with receiving an additional transmission of the system information in a second set of subframes. The second set of subframes correspond to subframes of the plurality of radio frames other than subframes #4. For example, the second set of subframes may correspond to subframes #3 of the plurality of radio frames. The additional transmission comprises additional coded bits associated with starting indexes continuing from starting indexes associated with the coded bits. In some embodiments, the second set of subframes comprises eight subframes, such that each of the eight subframes may include ⅛ of a codeword. In some embodiments, the eight subframes may be received in every other subframe #3. At least a portion of the system information may be received in one or more repetitions of the second set of subframes (such as up to sixteen repetitions).

At step 72, the method stores the coded bits in a circular buffer according to the starting indexes associated with the coded bits. In some embodiments, a first starting index is obtained using a modulo function based on a number of coded bits that can be mapped to the system information and the size of the circular buffer. As an example, suppose the circular buffer has a buffer size of 300 bits (e.g., A0-A299) and suppose the system information comprises a 400-bit long codeword (e.g., B0-B399). The method may begin storing coded bits in the circular buffer such that B0 is stored in buffer position A0, B1 is stored in buffer position A1, B2 is stored in buffer position A2, and so on until reaching the last position in the circular buffer (e.g., B299 is stored in buffer position A299). The method may then continue storing coded bits in the circular buffer beginning with buffer position A0 to store B300, buffer position A1 to store B301, and so on until the end of the codeword has been reached (e.g., B399 is stored in buffer position A99).

At step 73, the method stores the additional coded bits in the circular buffer according to the starting indexes that continue from the starting indexes associated with the coded bits. Referring to the example in the previous paragraph, suppose that the wireless device stored the coded bits received in the first set of subframes by storing through buffer position A99. The wireless device may then continue storing the additional coded bits from buffer position A100. In some embodiments, the method combines each of the values stored in the same buffer position to obtain information from which the system information may be decoded.

Figure 8:
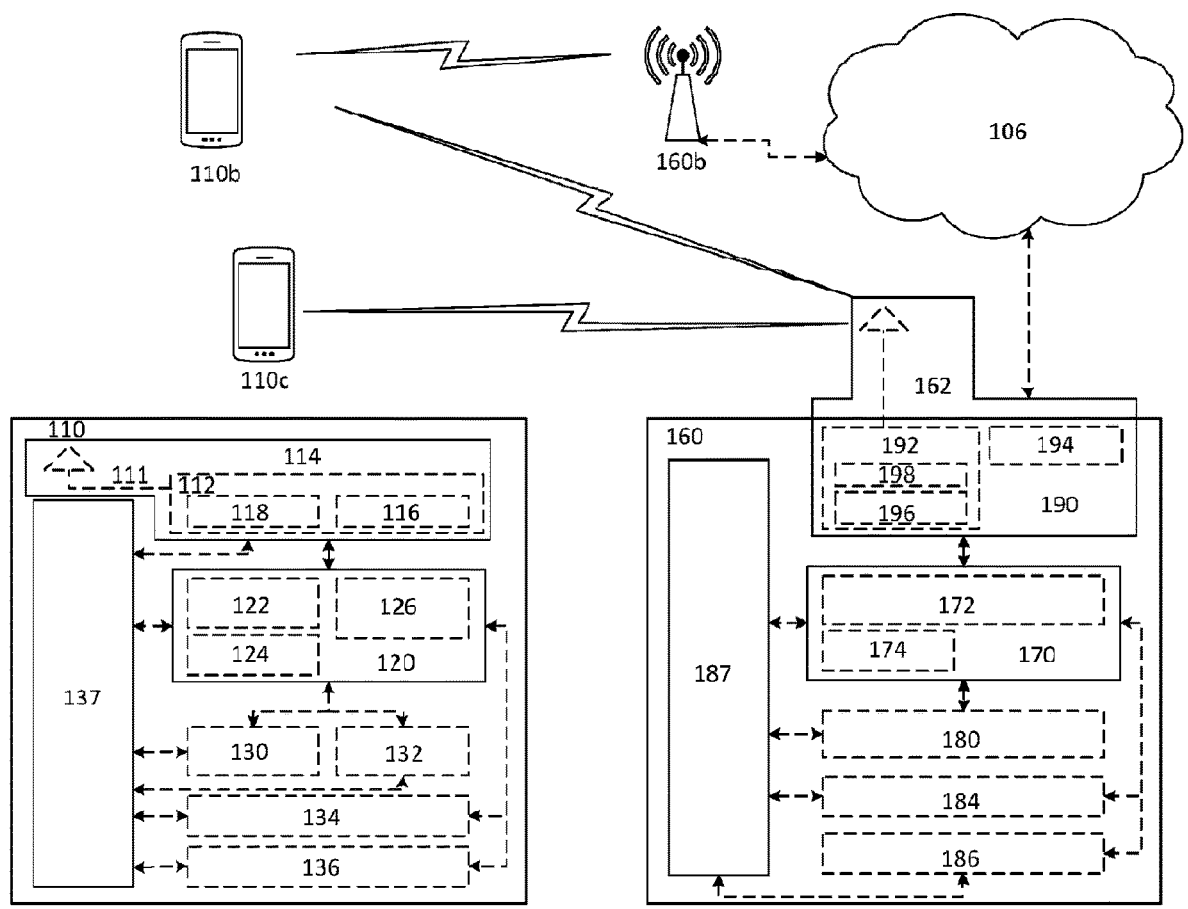
FIG. 8 illustrates an example of a wireless network, in accordance with some embodiments.

Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node 160 includes processing circuitry 170, device readable medium 180, interface 190, auxiliary equipment 184, power source 186, power circuitry 187, and antenna 162. Although network node 160 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 8 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (Vol P) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 9:
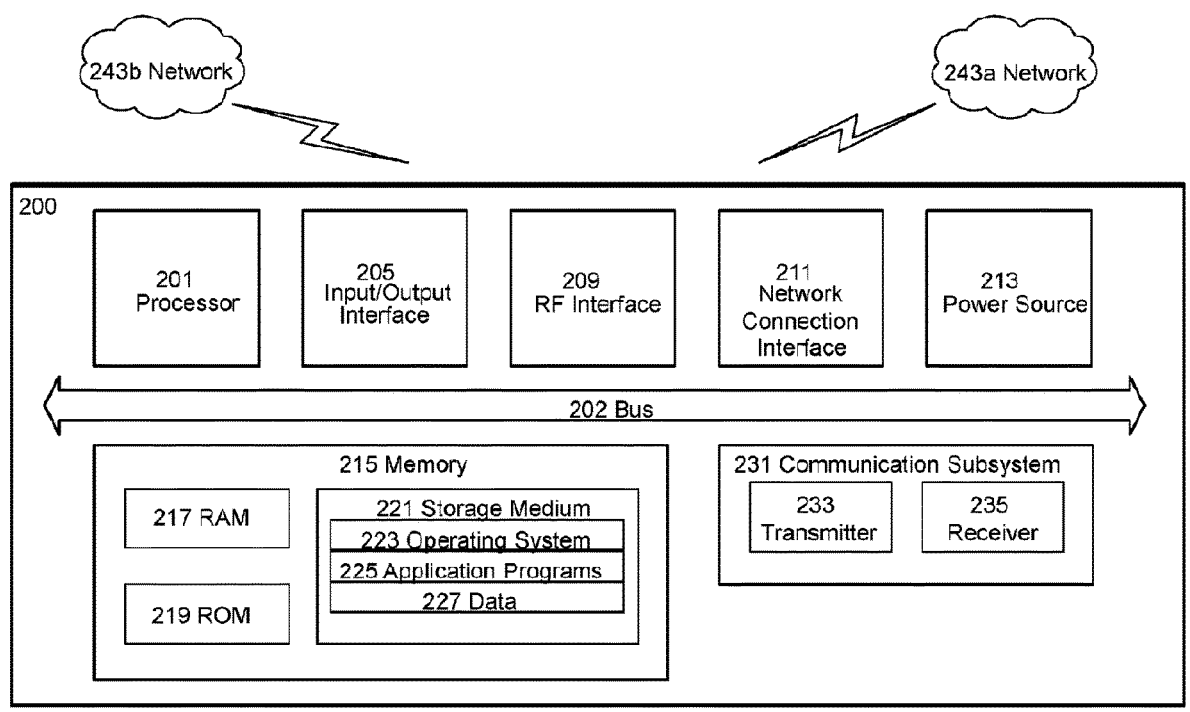
FIG. 9 illustrates an example of User Equipment, in accordance with some embodiments.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 9, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 9, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 10:
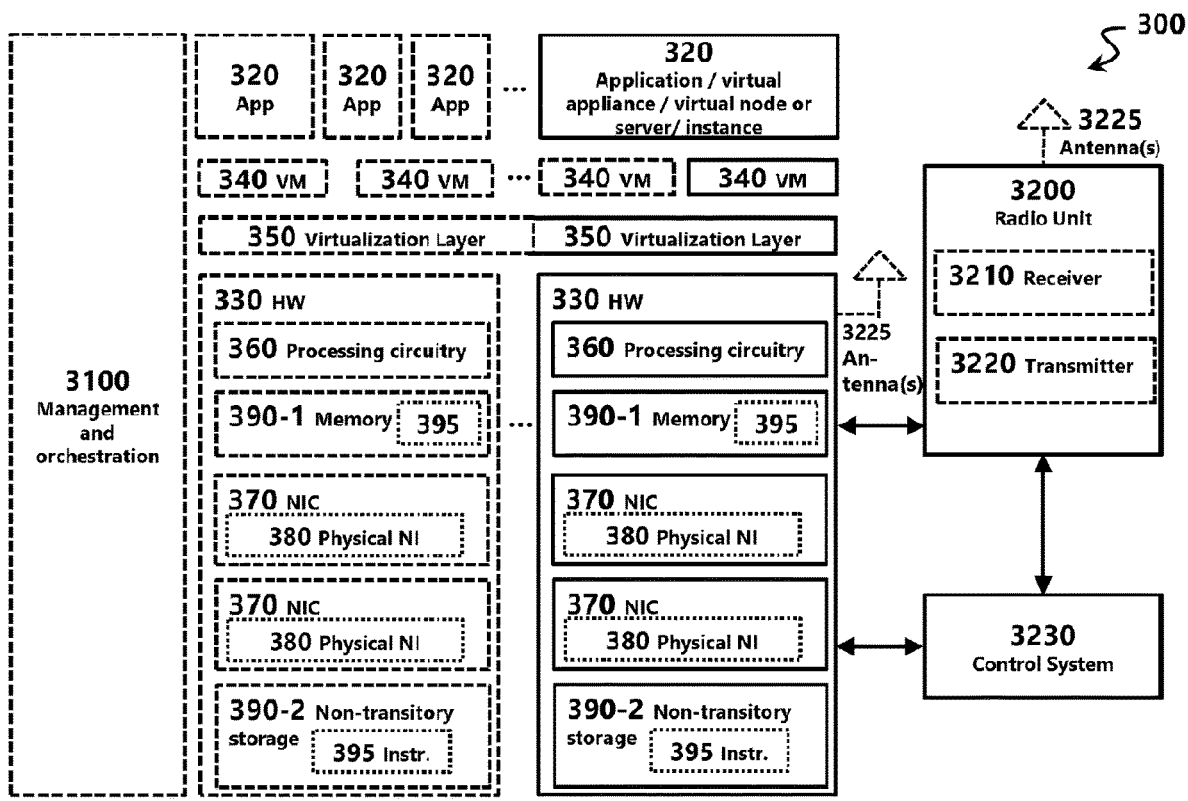
FIG. 10 illustrates an example of a virtualization environment, in accordance with some embodiments.

FIG. 10 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 10, hardware 330 may be a standalone network node with generic or specific components. Hardware 330 may comprise antenna 3225 and may implement some functions via virtualization. Alternatively, hardware 330 may be part of a larger cluster of hardware (e.g., such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 10.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 11:
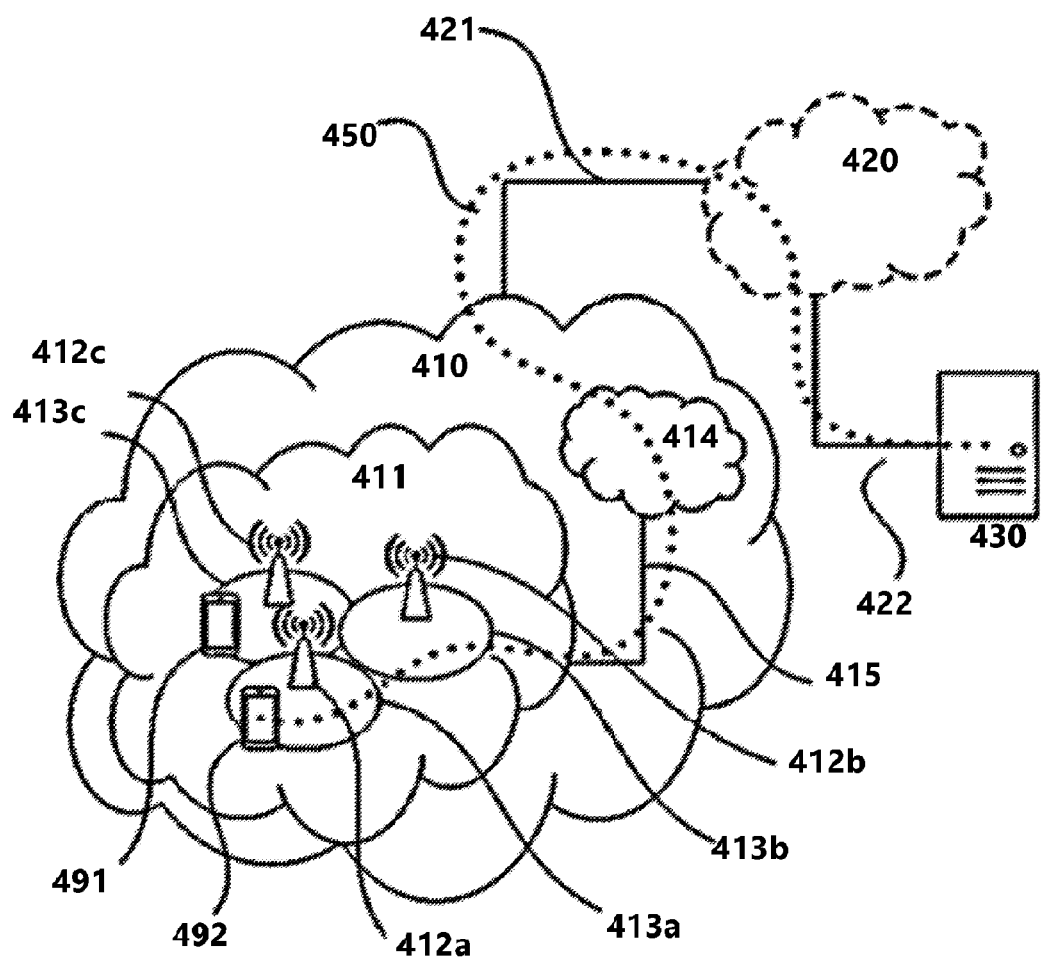
FIG. 11 illustrates an example of a telecommunication network connected via an intermediate network to a host computer, in accordance with some embodiments.

With reference to FIG. 11, in accordance with an embodiment, a communication system includes telecommunication network 410, such as a 3GPP-type cellular network, which comprises access network 411, such as a radio access network, and core network 414. Access network 411 comprises a plurality of base stations 412*a*, 412*b*, 412*c*, such as NBs, eNBs, gNBs or other types of wireless access points, each defining a corresponding coverage area 413*a*, 413*b*, 413*c*. Each base station 412*a*, 412*b*, 412*c* is connectable to core network 414 over a wired or wireless connection 415. A first UE 491 located in coverage area 413*c* is configured to wirelessly connect to, or be paged by, the corresponding base station 412*c*. A second UE 492 in coverage area 413*a* is wirelessly connectable to the corresponding base station 412*a*. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 11 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 12. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 12) served by base station 520. Communication interface 526 may be configured to facilitate connection 560 to host computer 510. Connection 560 may be direct or it may pass through a core network (not shown in FIG. 12) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

Figure 12:
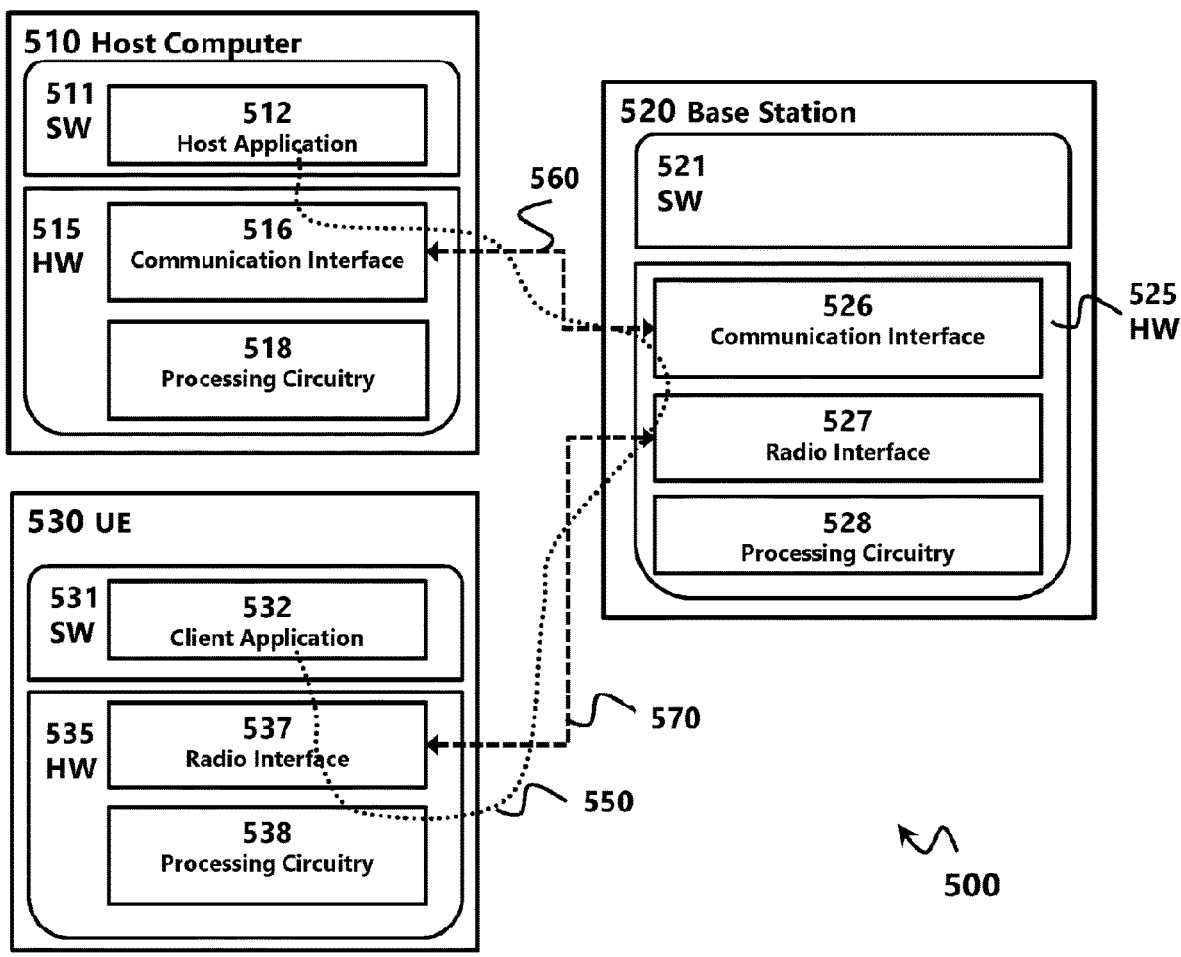
FIG. 12 illustrates an example of a host computer communicating via a base station with a user equipment over a partially wireless connection, in accordance with some embodiments.

It is noted that host computer 510, base station 520 and UE 530 illustrated in FIG. 12 may be similar or identical to host computer 430, one of base stations 412a, 412b, 412c and one of UEs 491, 492 of FIG. 11, respectively. This is to say, the inner workings of these entities may be as shown in FIG. 12 and independently, the surrounding network topology may be that of FIG. 11.

In FIG. 12, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the latency and thereby provide benefits such as reduced user waiting time.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 13, 14:
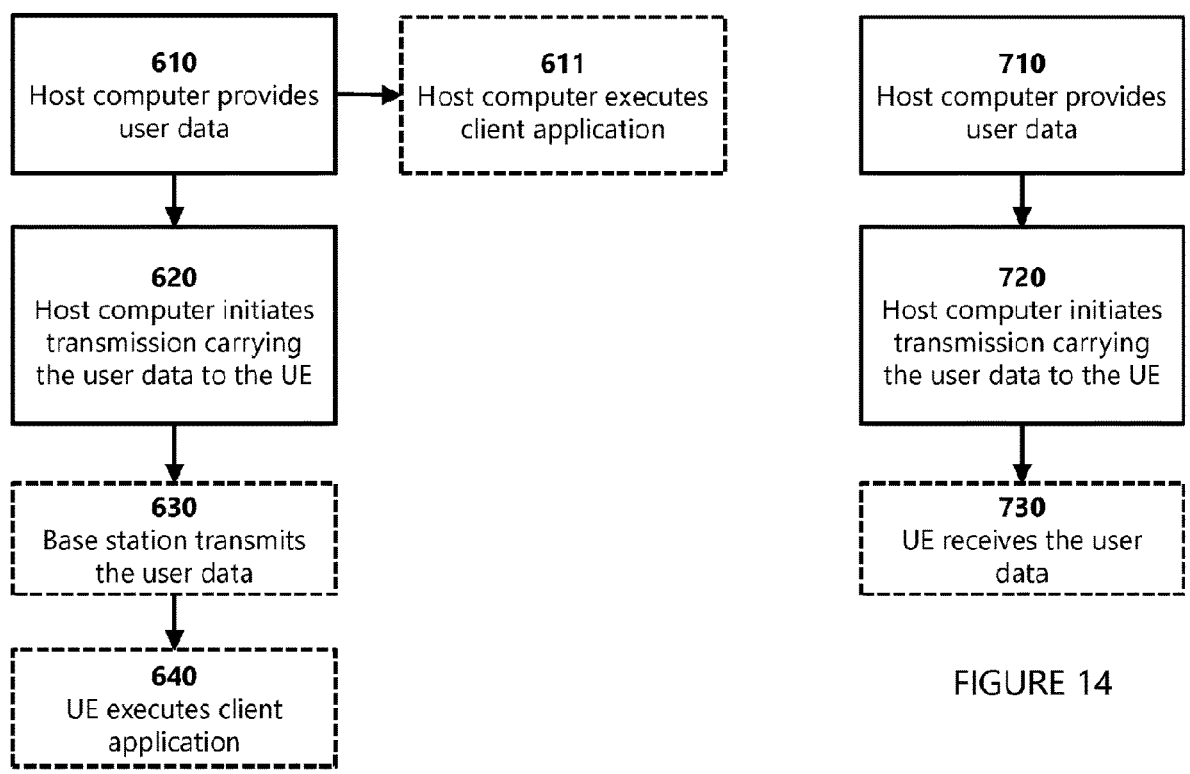
FIG. 13 illustrates an example of methods implemented in a communication system including a host computer, a base station and a user equipment, in accordance with some embodiments.
FIG. 14 illustrates an example of methods implemented in a communication system including a host computer, a base station and a user equipment, in accordance with some embodiments.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 15:
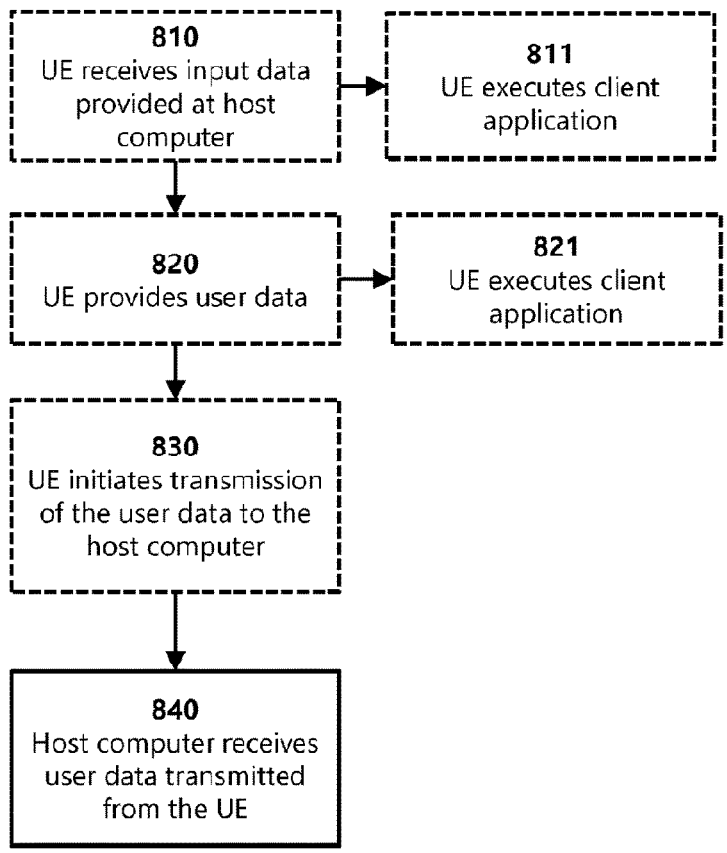
FIG. 15 illustrates an example of methods implemented in a communication system including a host computer, a base station and a user equipment, in accordance with some embodiments.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 16:
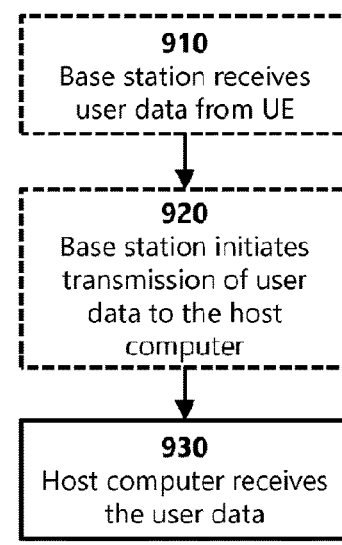
FIG. 16 illustrates an example of methods implemented in a communication system including a host computer, a base station and a user equipment, in accordance with some embodiments.

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

EMBODIMENTS

Group A Embodiments

1. A method performed by a wireless device, the method comprising:
receiving, by a receiver configured to receive SIB1-NB subframes from a transmitter configured according to any of the embodiments in Group B, a number of legacy SIB1-NB subframes and a number of additional SIB1-NB subframes.

2. The method of any of the previous embodiments, further comprising:
providing user data; and
forwarding the user data to a host computer via the transmission to the base station.

Group B Embodiments

3. A method performed by a base station, the method comprising:
transmitting a number of SIB1-NB subframes according to a legacy configuration;
determining a number of additional SIB1-NB subframes to transmit based on the transport block size of SIB1-NB;
transmitting the additional number of SIB1-NB subframes.

4. The method of the previous embodiment, wherein the number of SIB1-NB subframes transmitted according to the legacy configuration are transmitted on subframe #4 (e.g., according to Rel-13 or Rel-14).

5. The method of any of the previous embodiments, wherein the additional number of SIB1-NB subframes are transmitted on subframe #3 (e.g., according to Rel-15).

6. The method of any of the previous embodiments, further comprising increasing the number of additional SIB1-NB subframes for a larger transport block size of SIB1-NB.
7. The method of any of the previous embodiments, further comprising reducing the number of additional SIB1-NB subframes for a smaller transport block size of SIB1-NB.
8. The method of any of the previous embodiments, further comprising using every 4th subframe #3 for transmitting the additional SIB1-NB subframes when the transport block size of SIB1-NB is 208 or 328, and using every 8th subframe #3 for transmitting the additional SIB1-NB subframes when the transport block size of SIB1-NB is 440 or 680.
9. A method comprising:
   generating coded bits that will be transmitted in legacy SIB1-NB subframes by reading from a virtual circular buffer; and
   generating coded bits that will be transmitted in additional SIB1-NB subframes by continuing to read from the virtual circular buffer.
10. The method of the previous embodiment, wherein, for each SIB1-NB subframe, the coded bits are obtained based on a corresponding starting index for reading from the virtual circular buffer.
11. A method comprising:
   generating a scrambling sequence that will be used to scramble coded bits to be transmitted in additional SIB1-NB subframes, wherein the scrambling sequence uses a reinitialization scheme based on a legacy scrambling sequence, wherein the legacy scrambling sequence is extended to cover additional encoded bits.
12. The method of the previous embodiment, wherein the scrambling sequence for each one of the additional SIB1-NB subframes is generated with 2560 shifts relative to the scrambling sequence used in the legacy SIB1-NB subframe in the same frame.
13. The method of any of the previous embodiments, further comprising:
   obtaining user data; and
   forwarding the user data to a host computer or a wireless device.

Group C Embodiments

14. A wireless device, the wireless device comprising:
   processing circuitry configured to perform any of the steps of any of the Group A embodiments; and
   power supply circuitry configured to supply power to the wireless device.
15. A base station, the base station comprising:
   processing circuitry configured to perform any of the steps of any of the Group B embodiments;
   power supply circuitry configured to supply power to the wireless device.
16. A user equipment (UE), the UE comprising:
   an antenna configured to send and receive wireless signals;
   radio front-end circuitry connected to the antenna and to processing circuitry, and configured to condition signals communicated between the antenna and the processing circuitry;
   the processing circuitry being configured to perform any of the steps of any of the Group A embodiments;
   an input interface connected to the processing circuitry and configured to allow input of information into the UE to be processed by the processing circuitry;
   an output interface connected to the processing circuitry and configured to output information from the UE that has been processed by the processing circuitry; and
   a battery connected to the processing circuitry and configured to supply power to the UE.
17. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform any of the steps of any of the Group B embodiments.
18. The communication system of the pervious embodiment further including the base station.
19. The communication system of the previous 2 embodiments, further including the UE, wherein the UE is configured to communicate with the base station.
20. The communication system of the previous 3 embodiments, wherein:
   the processing circuitry of the host computer is configured to execute a host application, thereby providing the user data; and
   the UE comprises processing circuitry configured to execute a client application associated
21. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs any of the steps of any of the Group B embodiments.
22. The method of the previous embodiment, further comprising, at the base station, transmitting the user data.
23. The method of the previous 2 embodiments, wherein the user data is provided at the host computer by executing a host application, the method further comprising, at the UE, executing a client application associated with the host application.
24. A user equipment (UE) configured to communicate with a base station, the UE comprising a radio interface and processing circuitry configured to performs the of the previous 3 embodiments.
25. A communication system including a host computer comprising:
   processing circuitry configured to provide user data; and
   a communication interface configured to forward user data to a cellular network for transmission to a user equipment (UE),
   wherein the UE comprises a radio interface and processing circuitry, the UE's components configured to perform any of the steps of any of the Group A embodiments.

26. The communication system of the previous embodiment, wherein the cellular network further includes a base station configured to communicate with the UE.
27. The communication system of the previous 2 embodiments, wherein:
the processing circuitry of the host computer is configured to execute a host application, thereby providing the user data; and
the UE's processing circuitry is configured to execute a client application associated with the host application.
28. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.
29. The method of the previous embodiment, further comprising at the UE, receiving the user data from the base station.
30. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.
31. The communication system of the previous embodiment, further including the UE.
32. The communication system of the previous 2 embodiments, further including the base station, wherein the base station comprises a radio interface configured to communicate with the UE and a communication interface configured to forward to the host computer the user data carried by a transmission from the UE to the base station.
33. The communication system of the previous 3 embodiments, wherein:
the processing circuitry of the host computer is configured to execute a host application; and
the UE's processing circuitry is configured to execute a client application associated with the host application, thereby providing the user data.
34. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.
35. A method implemented in a communication system including a host computer, a base station and a user equipment (UE), the method comprising:
at the host computer, receiving user data transmitted to the base station from the UE, wherein the UE performs any of the steps of any of the Group A embodiments.
36. The method of the previous embodiment, further comprising, at the UE, providing the user data to the base station.

37. The method of the previous 2 embodiments, further comprising:
at the UE, executing a client application, thereby providing the user data to be transmitted; and
at the host computer, executing a host application associated with the client application.
38. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.
39. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.
40. The communication system of the previous embodiment further including the base station.
41. The communication system of the previous 2 embodiments, further including the UE, wherein the UE is configured to communicate with the base station.
42. The communication system of the previous 3 embodiments, wherein:
the processing circuitry of the host computer is configured to execute a host application;
the UE is configured to execute a client application associated with the host application, thereby providing the user data to be received by the host computer.
43. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.
44. The method of the previous embodiment, further comprising at the base station, receiving the user data from the UE.
45. The method of the previous 2 embodiments, further comprising at the base station, initiating a transmission of the received user data to the host computer.

The invention claimed is:
1. A method for use in a network node, the method comprising:
transmitting a transmission of system information comprising coded bits obtained by reading from a circular buffer, the transmission transmitted in a first set of subframes corresponding to subframes #4 of a plurality of radio frames; and
transmitting an additional transmission of the system information, the additional transmission comprising additional coded bits obtained by continuing reading from the circular buffer, the additional transmission transmitted in a second set of subframes corresponding to subframes of the plurality of radio frames other than the subframes #4,
wherein the first set of subframes comprises eight subframes transmitted in every other subframe #4, and wherein the second set of subframes comprises L subframes, where L is either four or eight, wherein a starting index for reading from the circular buffer for obtaining the coded bits for an ith subframe, in the first set of eight subframes, is iN modulo a size of the circular buffer, for i=0, 1, . . . , 7, wherein N is a number of coded bits that can be mapped to one subframe, and wherein a starting index for reading from the circular buffer for obtaining the additional coded bits for an ith subframe, in the second set of L subframes, is (iN+8N) modulo the size of the circular buffer, for i=0, 1, . . . , L−1.

2. The method of claim 1, wherein:
the second set of subframes correspond to subframes #3.

3. The method of claim 1, further comprising:
configuring sixteen repetitions of the first set of subframes;
configuring the second set of subframes based on having configured the sixteen repetitions of the first set of subframes.

4. The method of claim 1, further comprising:
transmitting sixteen repetitions of the first set of subframes.

5. The method of claim 1, wherein the system information comprises System Information Block Type 1-Narrowband (SIB1-NB) information.

6. A network node comprising processing circuitry, the processing circuitry operable to:
transmit a transmission of system information comprising coded bits obtained by reading from a circular buffer, the transmission transmitted in a first set of subframes corresponding to subframes #4 of a plurality of radio frames; and
transmit an additional transmission of the system information, the additional transmission comprising additional coded bits obtained by continuing reading from the circular buffer, the additional transmission transmitted in a second set of subframes corresponding to subframes of the plurality of radio frames other than the subframes #4,
wherein the first set of subframes comprises eight subframes transmitted in every other subframe #4, and wherein the second set of subframes comprises L subframes, where L is either 4 or 8,
wherein a starting index for reading from the circular buffer for obtaining the coded bits for an ith subframe, in the first set of 8 subframes, is iN modulo a size of the circular buffer, for i=0, 1, . . . , 7, wherein N is a number of coded bits that can be mapped to one subframe, and
wherein a starting index for reading from the circular buffer for obtaining the additional coded bits for an ith subframe, in the second set of L subframes, is (iN+8N) modulo the size of the circular buffer, for i=0, 1, . . . , L−1.

7. The network node of claim 6, wherein:
the second set of subframes correspond to subframes #3.

8. The network node of claim 6, the network node further operable to:
configure sixteen repetitions of the first set of subframes;
configure the second set of subframes based on having configured the sixteen repetitions of the first set of subframes.

9. The network node of claim 6, the network node further operable to:
transmit sixteen repetitions of the first set of subframes.

10. A method for use in a wireless device, the method comprising:
receiving a transmission of system information, the transmission comprising coded bits received in a first set of subframes corresponding to subframes #4 of a plurality of radio frames; and
receiving an additional transmission of the system information, the additional transmission comprising additional coded bits, the additional transmission received in a second set of subframes corresponding to subframes of the plurality of radio frames other than the subframes #4;
wherein the additional coded bits are associated with starting indexes continuing from starting indexes associated with the coded bits
wherein the first set of subframes comprises eight subframes received in every other subframe #4, and wherein the second set of subframes comprises L subframes, where L is either 4 or 8,
wherein the starting indexes associated with the coded bits for an ith subframe, in the first set of 8 subframes, is iN modulo a size of a circular buffer, for i=0, 1, . . . , 7, wherein N is a number of coded bits that can be mapped to one subframe, and
wherein the starting indexes associated with the additional coded bits for an ith subframe, in the second set of L subframes, is (iN+8N) modulo a size of the circular buffer, for i=0, 1, . . . , L−1.

11. The method of claim 10, wherein:
the second set of subframes correspond to subframes #3.

12. The method of claim 10, further comprising:
storing the coded bits in the circular buffer according to the starting indexes associated with the coded bits; and
storing the additional coded bits in the circular buffer according to the starting indexes that continue from the starting indexes associated with the coded bits.

13. The method of claim 10, wherein the system information comprises System Information Block Type 1-Narrowband (SIB1-NB) information.

14. A wireless device comprising processing circuitry, the processing circuitry operable to:
receive a transmission of system information, the transmission comprising coded bits received in a first set of subframes corresponding to subframes #4 of a plurality of radio frames; and
receive an additional transmission of the system information, the additional transmission comprising additional coded bits, the additional transmission received in a second set of subframes corresponding to subframes of the plurality of radio frames other than the subframes #4;
wherein the additional coded bits are associated with starting indexes continuing from starting indexes associated with the coded bits,
wherein the first set of subframes comprises eight subframes received in every other subframe #4, and wherein the second set of subframes comprises L subframes, where L is either 4 or 8,
wherein the starting indexes associated with the coded bits for an ith subframe, in the first set of 8 subframes, is iN modulo a size of a circular buffer, for i=0, 1, . . . , 7, wherein N is a number of coded bits that can be mapped to one subframe, and
wherein the starting indexes associated with the additional coded bits for an ith subframe, in the second set of L subframes, is (iN+8N) modulo a size of the circular buffer, for i=0, 1, . . . , L−1.

15. The wireless device of claim 14, wherein:
the second set of subframes correspond to subframes #3.

16. The wireless device of claim 14, further operable to:
store the coded bits in the circular buffer according to the starting indexes associated with the coded bits; and
store the additional coded bits in the circular buffer according to the starting indexes that continue from the starting indexes associated with the coded bits.

17. The wireless device of claim 14, wherein the system information comprises System Information Block Type 1-Narrowband (SIB1-NB) information.

18. A computer program product comprising a non-transitory computer readable medium storing instructions which, when executed by a wireless device, cause the wireless device to perform actions comprising:
receiving a transmission of system information, the transmission comprising coded bits received in a first set of subframes corresponding to subframes #4 of a plurality of radio frames; and
receiving an additional transmission of the system information, the additional transmission comprising additional coded bits, the additional transmission received in a second set of subframes corresponding to subframes of the plurality of radio frames other than the subframes #4;
wherein the additional coded bits are associated with starting indexes continuing from starting indexes associated with the coded bits,
wherein the first set of subframes comprises eight subframes received in every other subframe #4, and wherein the second set of subframes comprises L subframes, where L is either 4 or 8,
wherein the starting indexes associated with the coded bits for an ith subframe, in the first set of 8 subframes, is iN modulo a size of a circular buffer, for i=0, 1, . . . , 7, wherein N is a number of coded bits that can be mapped to one subframe, and
wherein the starting indexes associated with the additional coded bits for an ith subframe, in the second set of L subframes, is (iN+8N) modulo a size of the circular buffer, for i=0, 1, . . . , L−1.

* * * * *